US012659817B2

(12) United States Patent
Xu et al.

(10) Patent No.: US 12,659,817 B2
(45) Date of Patent: Jun. 16, 2026

(54) MECHANISM FOR CELL IDENTITY MANAGEMENT

(71) Applicant: Nokia Solutions and Networks Oy, Espoo (FI)

(72) Inventors: Xiang Xu, Nanjing (CN); Ilkka Keskitalo, Oulu (FI); Henri Koskinen, Espoo (FI); Ömer Bulakci, Munich (DE); Guillaume Decarreau, Munich (DE); Hajo Bakker, Eberdingen (DE); Oliver Blume, Stuttgart (DE)

(73) Assignee: Nokia Solutions and Networks Oy, Espoo (FI)

( * ) Notice: Subject to any disclaimer, the term of this patent is extended or adjusted under 35 U.S.C. 154(b) by 510 days.

(21) Appl. No.: 18/005,727

(22) PCT Filed: Aug. 5, 2020

(86) PCT No.: PCT/CN2020/107244
§ 371 (c)(1),
(2) Date: Jan. 17, 2023

(87) PCT Pub. No.: WO2022/027389
PCT Pub. Date: Feb. 10, 2022

(65) Prior Publication Data
US 2023/0292191 A1 Sep. 14, 2023

(51) Int. Cl.
*H04W 24/02* (2009.01)
*H04W 36/00* (2009.01)
*H04W 36/08* (2009.01)

(52) U.S. Cl.
CPC ....... *H04W 36/0061* (2013.01); *H04W 36/08* (2013.01)

(58) Field of Classification Search
CPC . H04W 36/0061; H04W 36/08; H04W 36/00; H04W 24/02
(Continued)

(56) References Cited

U.S. PATENT DOCUMENTS 11,218,921 B2 * 1/2022 Luo ........................ H04L 5/0091
11,343,728 B2 * 5/2022 Park .............. H04W 36/008355
(Continued)

FOREIGN PATENT DOCUMENTS

CN 102547886 A 7/2012
CN 108886722 A 11/2018
(Continued)

OTHER PUBLICATIONS

"3rd Generation Partnership Project; Technical Specification Group Radio Access Network; NG-RAN; Architecture description (Release 16)", 3GPP TS 38.401, V16.1.0, Mar. 2020, pp. 1-50.
(Continued)

*Primary Examiner* — Christopher M Crutchfield
*Assistant Examiner* — Syed Ahmed
(74) *Attorney, Agent, or Firm* — Barta Jones, PLLC

(57) ABSTRACT

Embodiments of the present disclosure relate to mechanism for cell identity management. According to embodiments of the present disclosure, a source device obtains identity information of a target device. The source device further obtains mapping from old cell ID to new cell ID for a migrating device and descendant devices of the migrating device. The mapping information receives from the target device or the migrating device. In this way, the device may be migrated to the target device without interrupting services of the terminal device which connects to the device.

2 Claims, 13 Drawing Sheets

(58) Field of Classification Search

USPC ......................................................... 370/331

See application file for complete search history.

(56) References Cited

U.S. PATENT DOCUMENTS

| | | | | |
|---|---|---|---|---|
| 11,627,518 | B2 * | 4/2023 | Luo ........................ | H04W 88/08 |
| | | | | 455/446 |
| 12,028,940 | B2 * | 7/2024 | Latheef ................. | H04W 12/06 |
| 12,082,068 | B2 * | 9/2024 | Eklöf ................ | H04W 36/0094 |
| 12,349,012 | B2 * | 7/2025 | Yan ...................... | H04W 36/185 |
| 2019/0053196 | A1 | 2/2019 | Abedini et al. | |
| 2022/0201777 | A1 | 6/2022 | Teyeb et al. | |
| 2022/0279552 | A1 * | 9/2022 | Teyeb ................... | H04W 40/22 |
| 2022/0286929 | A1 * | 9/2022 | Park .................. | H04W 36/0055 |
| 2022/0322464 | A1 * | 10/2022 | Luo ................... | H04W 36/0064 |
| 2022/0386187 | A1 * | 12/2022 | Yuan ................. | H04W 74/0841 |

FOREIGN PATENT DOCUMENTS

| | | | |
|---|---|---|---|
| CN | 110536350 | A | 12/2019 |
| CN | 110536377 | A | 12/2019 |
| CN | 110740485 | A | 1/2020 |
| CN | 111093211 | A | 5/2020 |
| CN | 111093286 | A | 5/2020 |
| EP | 2568749 | B1 | 1/2018 |
| WO | 2015/195010 | A1 | 12/2015 |
| WO | 2019/245547 | A1 | 12/2019 |
| WO | 2020/039346 | A1 | 2/2020 |

OTHER PUBLICATIONS

"3rd Generation Partnership Project; Technical Specification Group Radio Access Network; NG-RAN; F1 application protocol (F1AP) (Release 16)", 3GPP TS 38.473, V16.1.0, Mar. 2020, pp. 1-240.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Topology Adaptation Scenarios", 3GPP TSG-RAN WG3#101, R3-184896, Agenda Item: 24.1.1.1, Nokia, Aug. 20-24, 2018, 6 pages.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"This is the key to mobility robustness in 5G networks", Ericsson, Retrieved on Feb. 10, 2023, Webpage available at : https://www.ericsson.com/en/blog/2020/5/the-key-to-mobility-robustness-5g-networks.

"Inter IAB donor-CU topology adaptation", 3GPP TSG-RAN WG3 Meeting #106, R3-196995, Agenda Item: 13.3.2.3, Huawei, Nov. 18-22, 2019, pp. 1-4.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

Mwanje et al., "On the limits of PCI auto configuration and reuse in 4G/5G ultra dense networks", 11th International Conference on Network and Service Management (CNSM), Nov. 9-13, 2015, pp. 92-98.

"IEEE 802.11", Wikipedia, Retrieved on Feb. 10, 2023, Webpage available at : https://en.wikipedia.org/wiki/ IEEE 802.11.

International Search Report and Written Opinion received for corresponding Patent Cooperation Treaty Application No. PCT/CN2020/107244, dated Apr. 29, 2021, 9 pages.

"Inter-donor topology adaptation for architecture 1a", 3GPP TSG-RAN WG3 #102, R3-186751, Agenda Item: 24.2, LG Electronics Inc, Nov. 12-16, 2018, 7 pages.

Office Action received for corresponding Chinese Patent Application No. 202080104174.6, dated May 23, 2024, 10 pages of Office Action and no page of translation available.

"IP address management for IAB nodes", 3GPP TSG-RAN WG2 meeting #106, R2-1906066, Agenda Item: 11.1.6, Huawei, May 13-17, 2019, pp. 1-3.

"Discussion on inter-CU IAB migration handling", 3GPP TSG RAN WG3 Meeting #105, R3-193655, Agenda item: 13.3.2.3, ZTE, Aug. 26-30, 2019, 4 pages.

* cited by examiner

200

210 UE  220 IAB NODE  230 PARENT NODE  240 DONOR-CU  250 PARENT NODE  260 DONOR-CU

2001

2002

2003

2004

2005

2006

2007

2008

2009

700

710
RECEIVES IDENTITY INFORMATION OF A THIRD DEVICE

720
TRANSMIT THE IDENTITY INFORMATION TO THE FOURTH DEVICE

730
RECEIVE THE SECOND IDENTITY INFORMATION

740
TRANSMIT THE SECOND IDENTITY INFORMATION

900

910
RECEIVE A HANDOVER REQUEST FROM THE SECOND DEVICE

920
DETERMINE SECOND IDENTITY INFORMATION

930
TRANSMIT A HANDOVER REQUEST ACK

1000

1010
RECEIVE IDENTITY INFORMATION OF A THIRD DEVICE

1020
DETERMINE SECOND IDENTITY INFORMATION

1030
TRANSMIT THE SECOND IDENTITY INFORMATION

MECHANISM FOR CELL IDENTITY MANAGEMENT

RELATED APPLICATION

This application was originally filed as PCT Application No. PCT/CN2020/107244, filed on Aug. 5, 2020, which is incorporated herein by reference in its entirety.

FIELD

Embodiments of the present disclosure generally relate to the field of communications and in particular, to a method, device, apparatus and computer readable storage medium for cell identity management.

BACKGROUND

In recent communication field, several new communication technologies have been proposed. The 3rd Generation Partnership Project (3GPP) develops standards and specifications for new radio (NR) Integrated Access and Backhaul (IAB). An IAB node contains distributed unit (DU) and UE functions (Mobile Termination, MT). The packets are forwarded to or from the IAB by the radio layers below packet data convergence protocol (PDCP) layer. The intermediate JAB nodes perform hop-by-hop routing to maintain connectivity between a serving IAB node for a terminal device and an IAB donor that has a wired connection to core network (CN) or neighbouring base station.

SUMMARY

Generally, embodiments of the present disclosure relate to a method for cell identity management and the corresponding communication devices.

In a first aspect, there is provided a first device. The first device comprises at least one processor; and at least one memory including computer program codes; the at least one memory and the computer program codes are configured to, with the at least one processor, cause the first device to receive, from a second device, identity information of a third device, the first device to be handed over or migrated from the second device to the third device. The first device is also caused to obtain second identity information for a cell provided by the first device. The first device is further caused to transmit the second identity information to the second device.

In a second aspect, there is provided a second device. The a second device comprises at least one processor; and at least one memory including computer program codes; the at least one memory and the computer program codes are configured to, with the at least one processor, cause the a second device to transmit, to a first device, identity information of a third device, the first device to be handed over or migrated from the second device to the third device. The second device is further caused to obtain, from the first device or from the third device, second identity information for a cell provided by the first device. The second device is also caused to transmit a handover request to the third device, the handover request at least indicating a determined cell identity for the cell.

In a third aspect, there is provided a third device. The third device comprises at least one processor; and at least one memory including computer program codes; the at least one memory and the computer program codes are configured to, with the at least one processor, cause the third device to receive a handover request for a first device from a second device, the handover request at least indicating a first identity for a cell provided by a first device when the first device is in communication with the second device. The third device is further caused to allocate second identity information for a cell provided by the first device. The third device is also caused to transmit a handover request acknowledgment for the first device comprising the second identity information.

In a fourth aspect, there is provided a fourth device. The fourth device comprises at least one processor; and at least one memory including computer program codes; the at least one memory and the computer program codes are configured to, with the at least one processor, cause the fourth device to receive, from a first device, identity information of a third device. The fourth device is further caused to allocate second identity information based on the identity information of the third device. The fourth device is also caused to transmit to the first device the second identity information.

In a fifth aspect, there is provided a method. The method comprises receiving, at a first device and from a second device, identity information of a third device, the first device to be handed over or migrated from the second device to the third device. The method also comprises obtaining second identity information for a cell provided by the first device. The method further comprises transmitting to the second device the second identity information.

In a sixth aspect, there is provided a method. The method comprises transmitting, at a second device and to a first device, identity information of a third device, the first device to be handed over or migrated from the second device to the third device. The method also comprises obtaining, from the first device or from the third device, second identity information for a cell provided by the first device. The method further comprises transmitting a handover request to the third device, the handover request at least indicating a determined cell identity for the cell.

In a seventh aspect, there is provided a method. The method comprises receiving at a third device a handover request for a first device from a second device, the handover request at least indicating a first identity for a cell provided by a first device when the first device is in communication with the second device. The method also comprises allocating second identity information for a cell provided by the first device. The method further comprises transmitting a handover request acknowledgment for the first device comprising the second identity information.

In an eighth aspect, there is provided a method. The method comprises receiving, at a fourth device and from a first device, identity information of a third device. The method also comprises allocating second identity information based on the identity information of the third device. The method further comprises transmitting to the first device the second identity information.

In a ninth aspect, there is provided an apparatus. The apparatus comprises means for receiving, at a first device and from a second device, identity information of a third device, the first device to be handed over or migrated from the second device to the third device. The apparatus also comprises means for obtaining second identity information for a cell provided by the first device. The apparatus further comprises means for transmitting to the third device the second identity information.

In a tenth aspect, there is provided an apparatus. The apparatus comprises means for transmitting, at a second device and to a first device, identity information of a third device, the first device to be handed over or migrated from the second device to the third device. The apparatus also comprises means for obtaining, from the first device or from the third device, second identity information for a cell provided by the first device. The apparatus further comprises means for transmitting a handover request to the third device, the handover request at least indicating a determined cell identity for the cell.

In an eleventh aspect, there is provided an apparatus. The apparatus comprises means for receiving at a third device a handover request for a first device from a second device, the handover request at least indicating a first identity for a cell provided by a first device when the first device is in communication with the second device. The apparatus also comprises means for allocating second identity information for a cell provided by the first device. The apparatus further comprises means for transmitting a handover request acknowledgment for the first device comprising the second identity information.

In a twelfth aspect, there is provided an apparatus. The apparatus comprises means for receiving, at a fourth device and from a first device, identity information of a third device. The apparatus also comprises means for allocating second identity information based on the identity information of the third device. The apparatus further comprises means for transmitting to the first device the second identity information.

In a thirteenth aspect, there is provided a non-transitory computer readable medium comprising program instructions for causing an apparatus to perform at least the method according to any one of the above fifth to eighth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
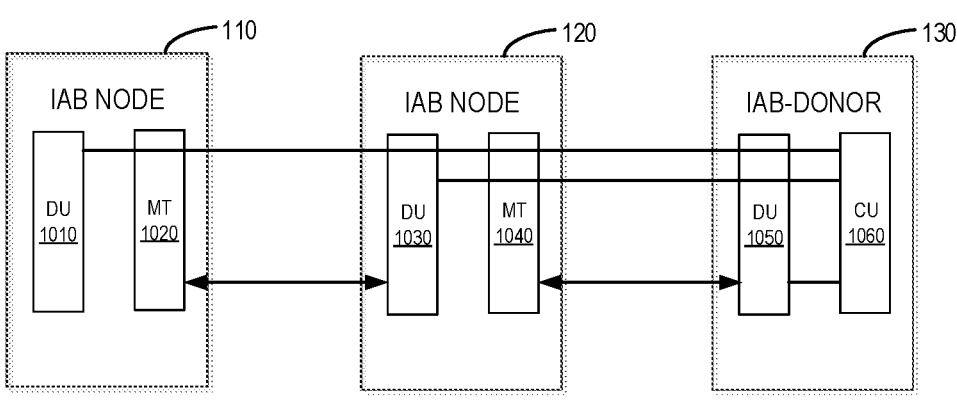
FIG. 1 illustrates a schematic diagram of an IAB architecture with CU-DU split.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. In case of split gNB architecture, a gNB comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates a schematic diagram of IAB architecture with CU-DU split. The IAB-node 110 hosts Mobile Termination (MT) part 1020 and DU part 1010. The MT part 1020 has UE functionality and connects to the parent node DU. The parent node can be either IAB-donor or another IAB-node 120. Backhaul RLC channel(s) are setup between the MT part 1020/1040 and the parent nodes DU part 1050 and adaptation layer is agreed to be on top of a radio link control (RLC) layer. The IAB-node DU 1030 (or 1010) part connects to the IAB-donor CU 1060 with F1 interface which is enhanced to support IAB functions. F1 packets including the F1 packets for user plane (UP) and the F1 packets for control plane (CP) are transported on top of the adaptation layer. IAB thus implements L2 relaying. An IAB node represents a co-located resource providing NR access coverage and backhauling over the air interface. As such, an IAB node may take on both the personality of UE (MT part) for transferring backhaul traffic or that of gNB (or gNB-DU) serving connected UEs and forwarding backhaul traffic to the next hop.

In this architecture, the core network (CN) interfaces are terminated at the IAB-donor and therefore the relaying is only radio access network (RAN) functionality. The solution leverages split gNB architecture for CU and DU so that the CU functions are at the IAB-donor and the DU is at the IAB node. For the connection setup and communication with the parent node (which can be another IAB node or the IAB-donor), IAB-node hosts the MT function corresponding to UE operation or a part of the UE operation.

IAB-DU has one or multiple cells the same way as gNB-DU with fixed connection to the gNB-CU. The IAB-DU cells broadcast normal control signals like Synchronization Signal Blocks (SSBs) for downlink (DL) synchronization, system information and therefore an IAB-DU cell will be seen as a normal cell from the UE point of view.

Due to possible failure on the backhaul (BH) connections, or changes in the IAB topology, or the mobility of the IAB, the IAB-node may need to change its parent node which can be under the same or different donor (refer to source donor, and target donor). Due to correlation between New Radio (NR) Cell Identity (NCI) and gNB ID, the IAB node needs to use different NCI, for example, a NCI (refer to old cell ID) when the IAB node connects to a parent node under the source donor, and another NCI (refer to new cell ID) when the IAB node connects to a parent node under the target donor.

Figures 2A, 2B:
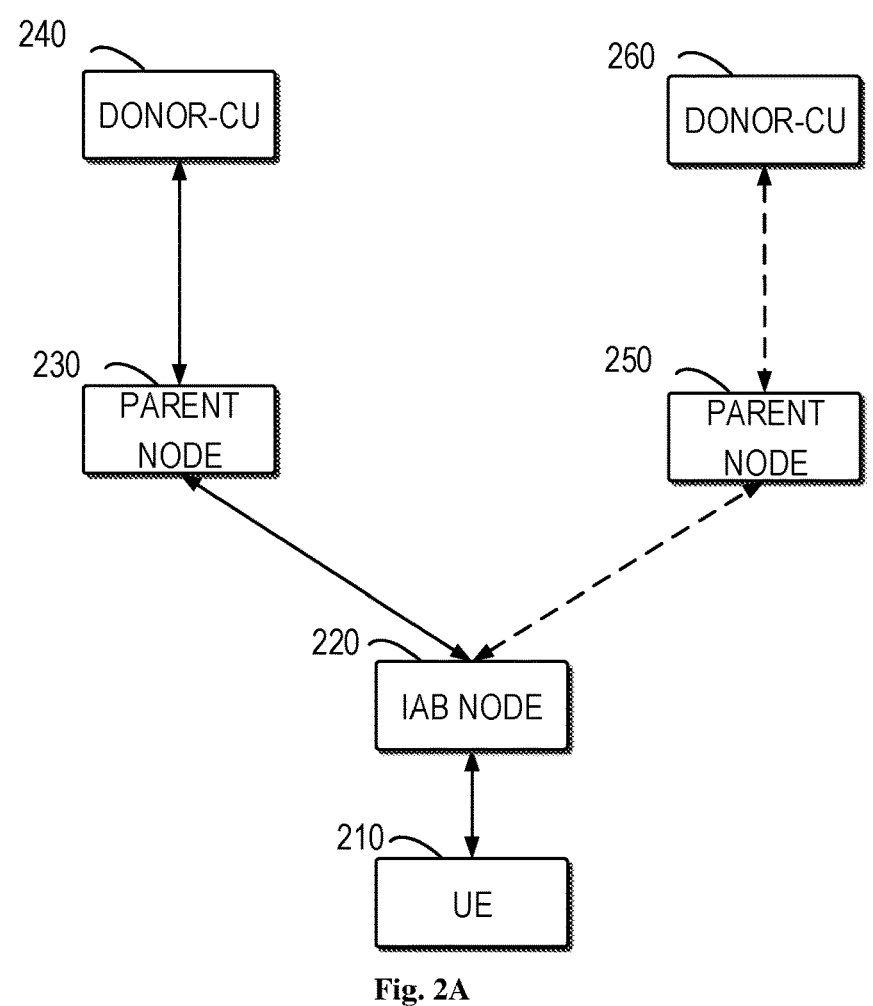
FIG. 2A illustrates a schematic diagram of a structure of an IAB system according to conventional technologies.
FIG. 2B illustrates a schematic diagram of interactions of inter-DU/intra-CU mobility according to conventional technologies.

FIG. 2A illustrates a schematic diagram of a structure of an IAB system according to conventional technologies. As shown in FIG. 2A, a UE 210 may connect with an IAB node 220 via a wireless link. The IAB node 220 may connect to a parent node 230 which may be an IAB node or a Donor-DU. Only for the purpose of illustrations, the parent node 230 may refer to an IAB node. Only as an example, as shown in FIG. 2A, the parent node 230 may connect with a Donor-CU 240. It should be noted there may be other IAB nodes and/or an IAB donor DU between the parent node 230 and the Donor-CU 240. When the IAB node 220 is in communication with Donor-CU 240, for example, setup a F1 interface, IAB node 220 use the cell identity related to Donor-CU 240 for the cell(s) in IAB node 220. In FIG. 2A, the IAB node 220 may migrate from the parent node 230 which is a source parent node to a target parent node 250. The target parent node 250 may be an IAB node or a Donor-DU. Only for the purpose of illustrations, the parent node 230 may refer to an IAB node. Only as an example, as shown in FIG. 2A, the parent node 250 may connect with a Donor-CU 260. It should be noted there may be other IAB nodes and/or an IAB donor DU between the parent node 250 and the Donor-CU 260. If the IAB node 220 migrate from the source parent node 230 to the target parent node 250, the IAB node 220 may release a wireless backhaul link with the parent node 230 and may establish a wireless backhaul link with the parent node 250. The adapted route between the parent node 230 and the Donor-CU 240 may also be released and an adapted route between the parent node 250 and the Donor-CU 260 may need to be established. When the IAB node 220 is in communication with Donor-CU 260, for example, setup a F1 interface, IAB node 220 use the cell identity related to Donor-CU 260 for the cell(s) in IAB node 220.

FIG. 2B illustrates a schematic diagram of interactions 200 of migrating from the source IAB node to the target IAB node according to conventional technologies. The interactions 200 may involve a UE 210, an IAB node 220, a parent node 230, a Donor-CU 240, a parent node 250, and a Donor-CU 260.

The UE 210 may connect with the IAB node 220 to transmit user data. The IAB node 220 may transmit 2001 a measurement report to the IAB node 230. The parent node 230 may transmit 2002 to the Donor-CU 240 an uplink RRC transfer message which may comprise the received measurement report. The Donor-CU 240 may decide to handover the IAB node 220 to Donor-CU 260. The Donor-CU 240 may transmit 2003 an Xn handover request to the Donor-CU 260. The Xn handover request includes a target cell ID of the parent node 250 that is under control of the Donor-CU 260. The Donor-CU 260 may transmit 2004 a UE context setup request to the IAB node 250. The parent node 250 may transmit 2005 a UE context setup response to the Donor-CU 260. The Donor-CU 260 may transmit 2006 an Xn handover request acknowledgment to the Donor-CU 240. The Donor-CU 260 may transmit 2007 a UE context modification request message which may comprise RRC reconfiguration for the IAB node 220. The parent node 230 may transmit 2008 the RRC Reconfiguration to the IAB node 220. Due to the change of the Donor node, the UE 210 also needs to be handed over to Donor-CU 260. To initiate the handover preparation for the UE 210, the Donor-CU 240 needs to know the target cell ID of the IAB 220, i.e. the new cell ID of the migrating IAB 220 after the migrating IAB 220 connects to the Donor-CU 260. The main question is how the Donor-CU 240 knows the new cell ID assigned to migrating IAB 220 after the migrating IAB connects to the Donor-CU 260.

According to embodiments of the present disclosure, a source device obtains identity information of a target device. The source device further obtains mapping from old cell identity (ID) to new cell ID for a migrating device. The mapping information is received from the target device or the migrating device. In this way, the source device is able to determine the target cell ID when the source device initiate the handover for the terminal devices connected to the migrating device, without interrupting services of the terminal device which connects to the device. Embodiments of the present disclosure can be applicable to a migrating device and its descendant devices. Only for the purpose of illustrations, embodiments of the present disclosure are described with the reference to the migrating device.

Figure 3:
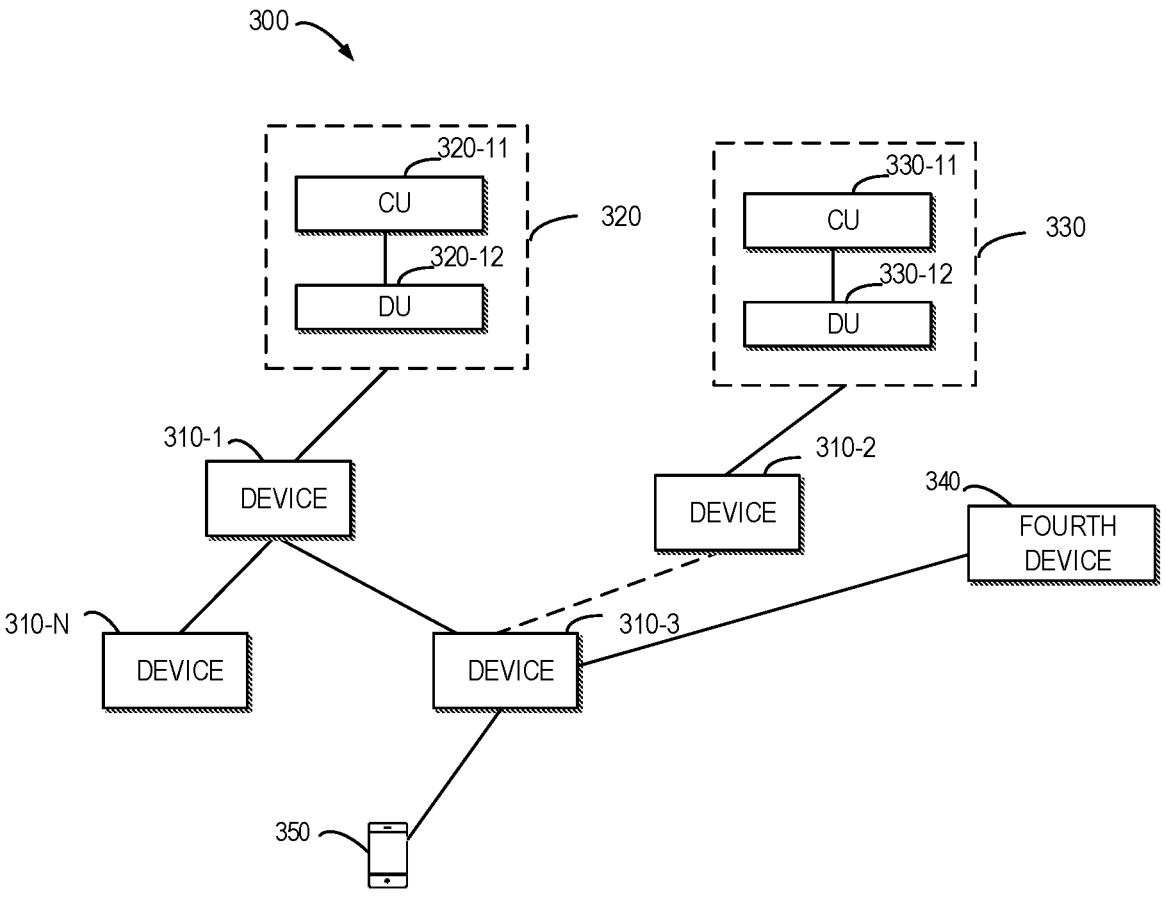
FIG. 3 illustrates a schematic diagram of a communication system according to embodiments of the present disclosure.

FIG. 3 shows an example communication system 300 in which example embodiments of the present disclosure can be implemented. The communication system 300 also comprises devices 310-1, 310-2, 310-3, . . . , 310-N which can be referred to as "first device(s) 310" (where N is a suitable integer number). The communication system 300 also comprises a second device 320 which comprises a CU 320-11 and one or more DUs, for example, the DU 320-12. The communication system 300 further comprises a third device 330 which comprises a CU 330-11 and one or more DUs, for example, the DU 330-12. The communication system 300 may also comprise a fourth device 340. The first device 310 may connect with one or more fifth devices 350. It should be noted that the communication system 300 may comprise any suitable number of devices. Only for the purpose of illustrations, the communication system 300 may refer to an IAB system. In this situation, the first devices 310 may refer to IAB nodes, the second device 320 and the third device 330 may refer to IAB donors and the fourth device 340 may refer to a management plane device, for example, an Operations Administration and Maintenance (OAM) server. The first device 310 may connect with a second device 320 or a third device 330, or another device 310. For example, the third device 310-3 may connect with the third device 310-1. The third device 310-1 may connect with the second device 320. Due to topology adaptation or mobility, the third device (for example, device 310-3) may change the parent node (for example, change the parent node from device 310-1 to device 310-2), and change the donor node (for example, from the second device 320 to the third device 330). Hereinafter, the CU of the IAB donor is also referred to as Donor-CU or donor central unit; and the DU of the IAB donor is also referred to as Donor-DU or donor distributed unit.

A CU (such as Donor-CU or CU of an IAB Donor) may be a logical node which may include the functions (for example, gNB-CU functions) such as transfer of user data, mobility control, radio access network sharing, positioning, session management etc., except those functions allocated exclusively to DUs. The CU may control the operation of the DUs over a front-haul (F1) interface. A DU (such as DU in the IAB, or the DU of an IAB Donor) is a logical node which may include a subset of the functions (for example, gNB-DU functions), depending on the functional split option. The operations of the DUs may be controlled by the CU.

It is to be understood that the number of IAB nodes and terminal devices connected to the IAB nodes is only for the purpose of illustration without suggesting any limitations. The IAB system may include any suitable number of IAB nodes and terminal devices adapted for implementing example embodiments of the present disclosure.

It is to be understood that the numbers of CU, DU and the IAB nodes are only for the purpose of illustration without suggesting any limitations. The communication system 300 may include any suitable number of network devices and terminal devices adapted for implementing embodiments of the present disclosure.

Communications in the communication system 300 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 4A:
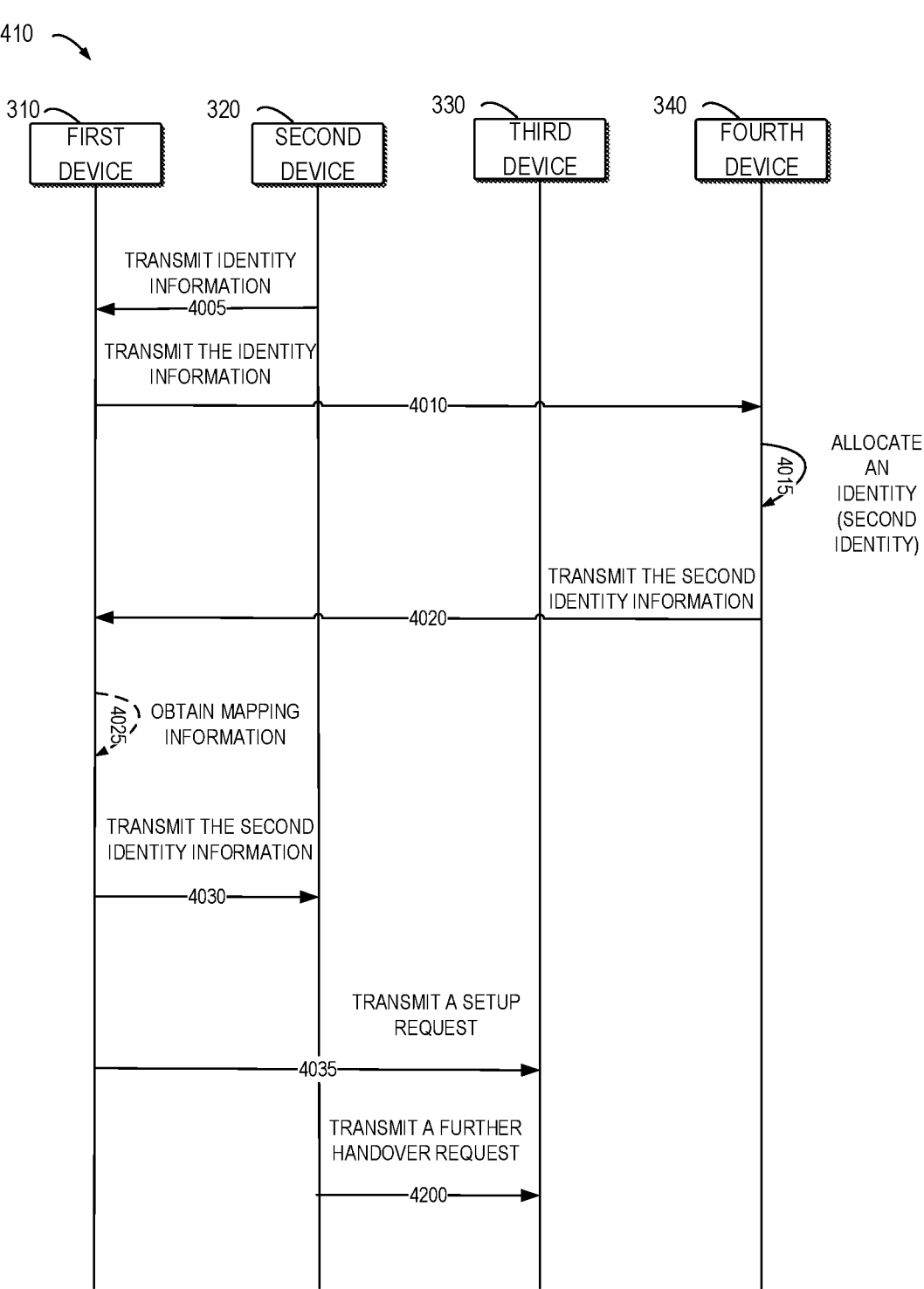
FIGS. 4A and 4B illustrates schematic diagrams of interactions among devices according to embodiments of the present disclosure, respectively.
Figure 4B:
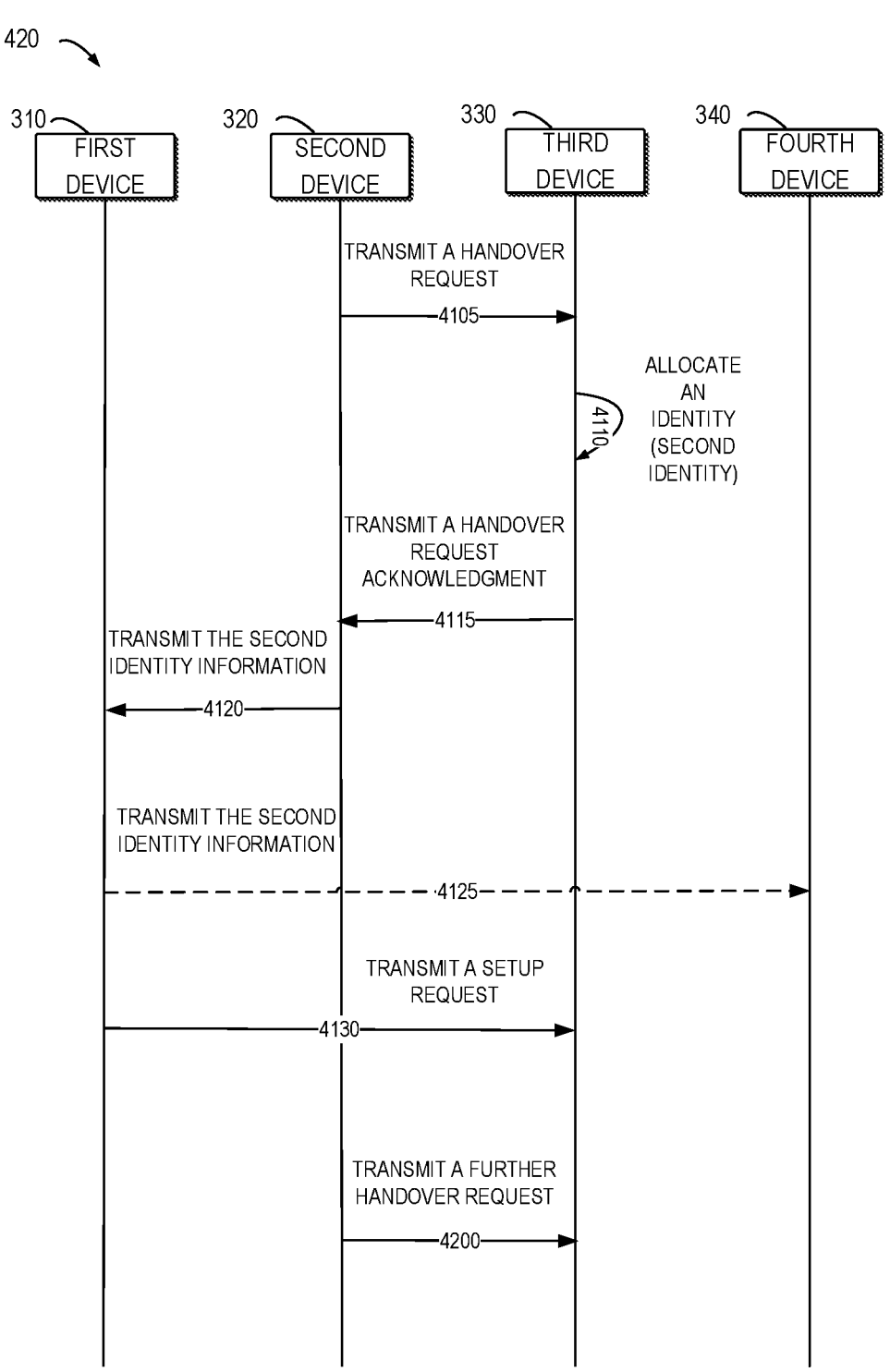

FIGS. 4A and 4B illustrate schematic diagrams of interactions for cell identity management in accordance with embodiments of the present disclosure. The interactions may be implemented at any suitable devices. Only for the purpose of illustrations, the interactions are described to be implemented at the first device 310, the second device 320, the third device 330 and the fourth device 340. FIG. 4A illustrates a schematic diagram of an example procedure for cell identity management according to some example embodiments of the present disclosure and FIG. 4B shows an alternative procedure 420 for cell identity management according to other example embodiments of the present disclosure. In some embodiments, the first device 310 may refer to a migrating device. Alternatively or in addition, the first device 310 may refer to descendant devices of a migrating device. Embodiments of the present disclosure are not limited in this aspect.

During the procedure 410, in some embodiments, if the first device 310 is a parent IAB node, the first device 310 may transmit a measurement report to the second device 320. In some embodiments, if the first device 310 is a child IAB node, the first device 310 may not transmit the measurement report. The measurement report may indicate link qualities of the neighboring cells (including the cells of the third device, second device and other devices) measured by the first device 310. The second device 320 may determine that the first device 310 needs to be handed over to the third device 330. The second device 320 may transmit a handover request to the third device 330 to initiate handover preparation. In another embodiment, the second device 320 may select more than one candidate cell for the handover preparation, and initiate multiple handover preparation to the neighboring devices (including the third device 330, and other devices not shown in the figure). During the handover preparation, UE context and one or more bearers may be set up.

As shown in FIG. 4A, the second device 320 transmits 4005 identity information of the third device 330 to the first device 310. The first device 310 is to be handed over or migrated from the second device to the third device. In some embodiments, the identity information may be transmitted via Radio Resource Control (RRC) signaling or F1 application protocol (FLAP) signaling. For example, the identity information may be transmitted in the RRC Reconfiguration message. The first device 310 may recognize that the RRC Reconfiguration message is associated with handover/migration to the third device 330. In some other embodiments, the third device 330 may include the identity information in the HandoverCommand message when the third device 330 transmits a handover request acknowledgement to the second device 320. The identity information can be a cell identity (ID) of the target cell in the third device 330, or physical cell identity (PCI) of the target cell in the third device 330, or the Global NG-RAN Node ID of the third device 330, or any other identity that can identify the third device 330. When the second device 320 has initiated multiple handover preparation to the third device 330 and other neighboring devices, the second device 320 transmit the first device 310 the identity information of the third device 330 and other neighboring devices. In some other embodiments, the second device 320 may select only one target device, for example, the third device 330, and only transmit the identity the information of the third device 330 to the first device.

The first device 310 transmits 4010 the identity information of the third device 330 to the fourth device 340. In this way, the first device 310 may inform the fourth device 340 about the third device 330 which is the target device. In another embodiment, when the second device 320 initiates multiple handover preparations for the first device 310, the identity information includes the identity of the third device 330 and other neighboring devices that the second device 320 has initiated handover preparation to. In this way, the first device 310 may inform the fourth device 340 about the third device 330 and other neighboring devices which are the candidate target devices. In some example embodiments, the identity information of the third device 330 comprises at least one of: a global node identity, a cell identity of the cell of third device, and a physical cell identification of the cell of the third device 330.

The fourth device 340 allocates 4015 an identity (refer to the second identity or new identity herein) for the cell(s) of the first device 110 based on the received identity information of the third device 330. The second identity is to be used by the first device 310, when the first device 310 is in communication with the third device 330. The second identity includes at least one of the cell identity, and the physical cell identity. In some embodiments, the fourth device 340 may also determine mapping information between the second identity for the cell of the first device 310 (i.e. the identity used by the first device 310 when the first device 310 is in communication with the third device 330) and a first identity assigned for a cell of the first device 310 (i.e. the identity used by the first device 310 when the first device 310 is in communication with the second device 320, which is referred to as the first identity or old identity herein). The second identity includes at least one of the cell identity, and the physical cell identity. The first identity includes at least one of the cell identity, and the physical cell identity. In other words, the mapping information may indicate the mapping relationship between the old identity (ID), for example, the first (or old) cell ID, of the cell in the first device 310 which is used when the first device 310 connected with a parent node under the control of the second device 320, and the new identity, for example, the second (or new) cell ID, of the cell in the first device 310 which is to be used to connect with a parent node under the control of the third device 330.

In another example, the mapping information may indicate the mapping relationship between the second identity which is used by the first device 310 when the first device 310 setup a F1 interface with the third device 330, and the first identity which is used by the first device 310 when the first device 310 setup a F1 interface with the second device 320. Alternatively or in addition, the fourth device 340 may reconfigure slice support information of the first device 310 considering the slice support information of the third device 330. Each network slice or simply slice is a logical end-to-end network, e.g., tailored to fulfill diverse requirements requested by a particular application or service. Slice support information may include, e.g., a list of slice identities (such as single network slice selection assistance information, S-NSSAIs) that are supported by a device.

The fourth device 340 transmits 4020 the second identity information to the first device. The second identity information indicates at least one of the allocated identities (i.e. the second identity or the new identity) for the cell of the first device 310, and the mapping information between the old identity and the new identity. The second identity information includes at least the second cell identity or the physical second cell identity. The mapping information includes at least the mapping for the cell identity or the mapping for the physical cell identity.

In some embodiments, the first device 310 may obtain 4025 the mapping information from the second identity information transmitted by the fourth device 340. The first device 310 may transmit 4030 the second identity information, for example, the mapping information, to the second device 320. In this situation, the second device 320 is able to obtain the new identity of the cell in the first device 310, when the first device 310 connects with the third device 330 which is the target device. In this way, it enables to use the handover procedure for terminal devices connected to first device 310. For example, a terminal device connects with a cell with cell identity #1000 (i.e. the old cell identity) in the first device 310 when the first device 310 connects with a parent node under the control of the second device 320. After the first device 310 is handover to a parent node under the control of the third device 330, this cell is allocated with a new cell identity #2000. With the steps described above, the second device 320 can know the old cell identity #1000 is mapped to the new cell identity #2000, and use cell identity #2000 as target cell identity when initiate the handover preparation for the terminal device. Further, it solves a key issue on the cell ID management in case of inter-donor topology adaptation/inter-donor mobility when the terminal devices are kept and will be connected to the same physical cell.

The first device 310 transmits 4035 a setup request to the third device 330. The setup request comprises the second identity for the cell(s) of the first device 310. For example, the first device 310 may initiate F1 setup with the third device 330. The F1 SETUP REQUEST message includes the second identity, for example, the second cell identity and the second physical cell identity. In this way, the first device 310 is able to connect with the third device 330 and setup F1 interface using the correct identity with the third device 330.

The second device 320 may initiate the further handover procedure for the terminal device(s) connected to the first device 310. The second device 320 may determine the target cell identity based on the second identity information, and a first cell identity for the cell in the first device 310 that is serving the terminal device. For example, a terminal device connects with a cell with cell identity #1000 (i.e. the old cell identity) in the first device 310 when the first device 310 is in communication with the second device 320 (for example, the F1 interface is setup between the first device 310 and the second device 320). After the first device 310 is handover to a parent node under the control of the third device 330, this cell is allocated with a new cell identity #2000. With the steps described above, the second device 320 can know the old cell identity #1000 is mapped to the new cell identity #2000, and may use cell identity #2000 as target cell identity when initiate the handover preparation for the terminal device. The second device 320 transmits 4200 a further handover request to the third device 330. The further handover request comprises the determined identity of the cell of the first device 310.

As shown in FIG. 4B, during the procedure 420, if the first device 310 is a parent IAB node, the first device 310 may transmit a measurement report to the second device 320. In some embodiments, if the first device 310 is a child IAB node, the first device 310 may not transmit the measurement report. The measurement report may indicate link qualities of the neighboring cells (including the cells of the first device, third device and other devices) measured by the terminal device and forwarded to the first device 310. Alternatively or in addition, the measurement report may also indicate link qualities between the first device and other devices. The second device 320 may determine that the first device 310 needs to be handed over to the third device 330. The second device 320 transmit 4105 a handover request to the third device 330. The handover request may comprise the first identity for the cell(s) provided by the first device 310. The first identity of the cell may include the first cell identity, i.e. NR Cell Identity (NCI), and the first physical cell identity. In other words, the handover request comprises old cell IDs which are used by the cells provided by the first device 310 when the first device 310 connect or setup F1 interface with the second device 320. During the handover preparation, UE context and one or more bearers may be set up.

The third device 330 determines and allocates 4110 the second identity for the cell(s) of the first device 310, which is to be used by the first device 310 when the first device 310 is in communication with the third device 330, for example, when the first device 310 initiate the F1 setup with the third device 330. The second identity includes at least one of the cell identity, and the physical cell identity. The first identity includes at least one of the cell identity, and the physical cell identity. In some embodiments, the third device 330 may also determine mapping information between the second identity of the cell of the first device 310 and a first identity of a cell of the first device 310. In other words, the mapping information may indicate the mapping relationship between the first or old identity (ID), for example, the first or old cell identity, which are used to connect with the second device 320, and the second or new ID, for example, the second or new cell identity which are to be used to connect with the third device 330. The mapping information includes at least the mapping for the cell identity or the mapping for the physical cell identity.

The third device 330 transmits 4115 a handover request acknowledgment to the second device 320. The handover request acknowledgment comprises the second identity information. The second identity information indicates at least one of the second cell identity, the second physical cell identity, the mapping information between the second cell identity and the first cell identity, and the mapping information between the second physical cell identity and the first physical cell identity. In this situation, the second device 320 is able to obtain the second identity of the cell provided by the first device 310 when the first device 310 in communication with the third device 330 which is the target device. In this way, it enables to use the handover procedure for terminal devices connected to first device 310. Further, it solves a key issue on the cell ID management in case of inter-donor topology adaptation/inter-donor mobility when the terminal devices are kept and will be connected to the same physical cell.

The second device 320 transmits 4120 the second identity information for the cell of the first device 310 to the first device 310. In some embodiments, the second identity information may be transmitted via Radio Resource Control (RRC) signaling. For example, the second identity information may be transmitted in the RRC Reconfiguration message. In some other embodiments, the second device 320 may receive the second identity information in a RRC container included in an XnAP message, from the third device 330. The first device 310 may recognize that the RRC Reconfiguration message is associated with handover/migration to the third device 330. In some embodiments, the second identity information may comprise the mapping information.

The first device 310 may transmit 4125 the second identity information to the fourth device 340. In this way, the first device 310 may inform the fourth device 340 the third device 330 which is the target device.

The first device 310 transmits 4130 a setup request to the third device 330. The setup request comprises the second identity information for the cell(s) of the first device 310. For example, the first device 310 may initiate F1 setup with the third device 330. The F1 SETUP REQUEST message includes the second identity, for example, the second cell identity and the second physical cell identity. In this way, the first device 310 is able to connect with the third device 330 and setup F1 interface using the correct identity with the third device 330.

The second device 320 may initiate the further handover procedure for the terminal device(s) connected to the first device 310. The second device 320 may determine the target cell identity based on the second identity information, and a first cell identity for the cell in the first device 310 that is serving the terminal device. For example, a terminal device connects with a cell with cell identity #1000 (i.e. the old cell identity) in the first device 310 when the first device 310 is in communication with the second device 320 (for example, the F1 interface is setup between the first device 310 and the second device 320). After the first device 310 is handover to a parent node under the control of the third device 330, this cell is allocated with a new cell identity #2000. With the steps described above, the second device 320 can know the old cell identity #1000 is mapped to the new cell identity #2000, and use cell identity #2000 as target cell identity when initiate the handover preparation for the terminal device. The second device 320 transmits 4200 a further handover request to the third device 330. The further handover request comprises the determined identity of the cell of the first device 310.

Alternatively or in addition, a conditional handover (CHO) may be configured for the first device 310. For example, the communication with the fourth device 340 and the new ID assignment may be done before the handover execution. In this way, the cell ID or the physical cell ID may be received in advance, thereby reducing the handover execution time. It can also give time to the first device 310 to make the connection to the third device 330 and change the cell configuration. In some embodiments, this conditional handover may be trigged by vanishing the current serving cells of the second device 320.

According to embodiments of the present disclosure, the source donor can obtain the second identity, which is to be used by the migrating IAB node after the migrating IAB node connect to the target donor. In this way, the source donor can initiate the handover preparation procedure for the terminal device(s) connected to the migrating IAB device without interrupting services of the terminal device which connects to the migrating IAB device.

Figure 5:
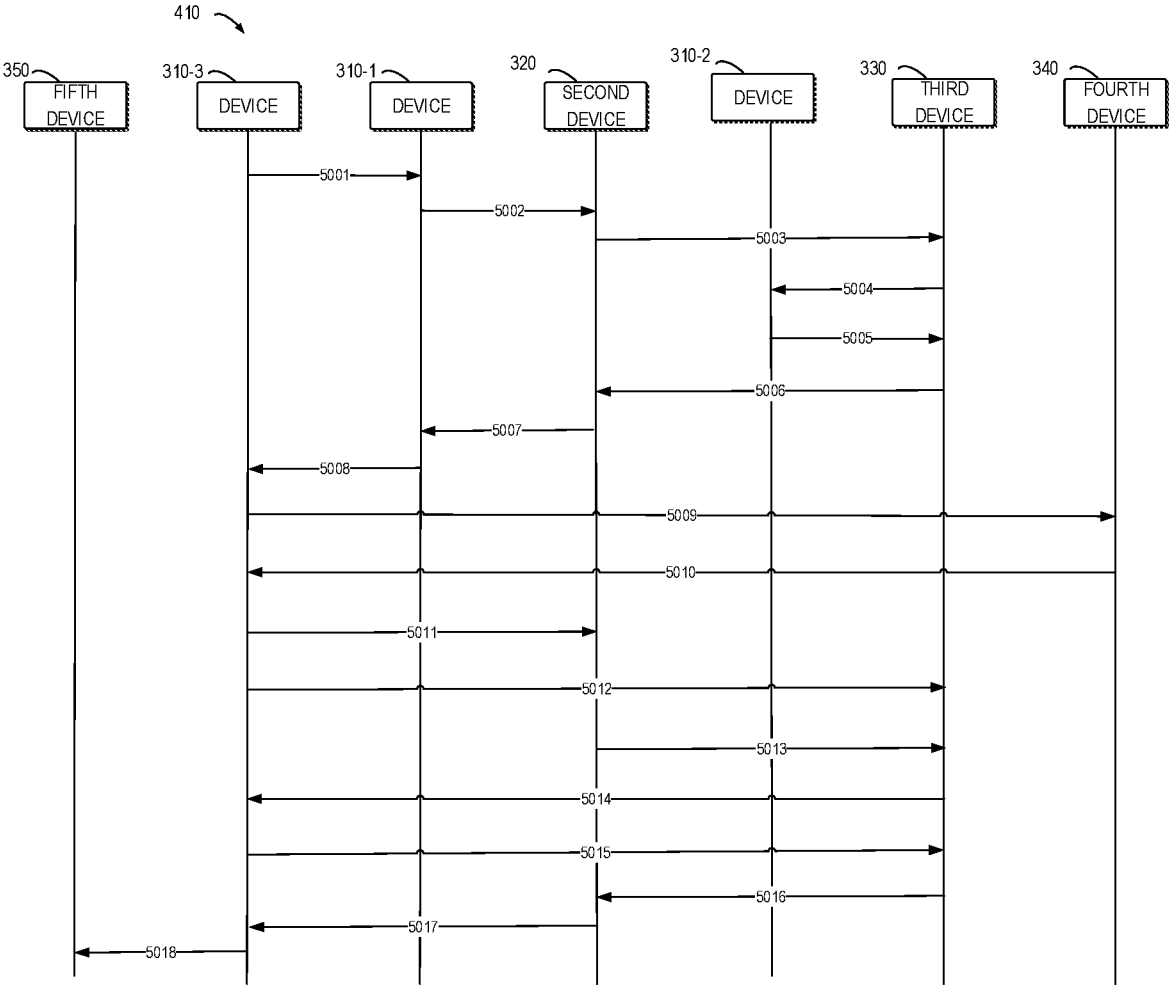
FIG. 5 illustrates a schematic diagram of interactions among devices according to embodiments of the present disclosure.

FIG. 5 illustrates an example of the procedure 410 according to some embodiments of the present disclosure. By way of example, embodiment shown in FIG. 5 involves the device 310-3, the device 310-1, the device 310-2, the second device 320, the third device 330, the fourth device 340 and the fifth device 350. The device 310-1 may be the parent node of the device 310-3 and the fifth device 350 may connect with the device 310-3.

The device 310-3 may send 5001 a measurement report message to the device 310-1 which may be a source IAB-node DU. The device 310-1 may transmit 5002 an uplink RRC transfer message to the second device 320 to convey the received measurement report. The second device 320 may transmit 5003 a Handover Request message to the third device 330 to initiate handover preparation. The Handover Request message may be an Xn Handover Request message when Xn-based handover is used, or an NG Handover Request message when N2-based handover is used. The third device 330 may transmit 5004 a UE Context Setup Request message to the device 310-2 to create an MT context and setup one or more bearers. The device 310-2 may respond 5005 to the third device 330 with a UE Context Setup Response message. The third device 330 may respond 5006 to the second device 320 with an Xn Handover Request Acknowledge message. The third device 330 also includes the identity information of the third device 330, for example, the identity may be the target cell ID of the device 310-2 which can be used to derive the identity of the third device 330, or the gNB ID of the third device 330, in the HandoverCommand message.

The second device 320 may send 5007 a UE CONTEXT MODIFICATION REQUEST message or a downlink RRC Transfer message to the device 310-1, which includes a generated RRCReconfiguration message for the device 310-3. The device 310-1 may forward 5008 the received RRCReconfiguration message to the device 310-3. The device 310-3 may recognize that the RRCReconfiguration is association with migration to a different IAB-donor CU. The RRCReconfiguration message includes the identity information of the third device 330, for example, the identity may be the target cell ID of the device 310-2, or the gNB ID of third device 330.

Upon the reception of the RRCReconfiguration message, the device 310-3 may inform 5009 the fourth device 340 the information of the third device 330, for example, the cell ID of the device 310-2, or the gNB ID of the third device 330. Based on the information of the third device 330, the fourth device 340 may allocate and provide 5010 the device 310-3 with the information of the second identity or new identity for the cell(s) in the device 310-3 to be used when the device 310-3 connects with a parent node under the control of the third device 330 or when the device 310-3 setup F1 interface with the third device 330. The second identity includes at least one of the cell identity and the physical cell identity for the cell(s) of the device 310-3. The above information may also include the mapping between the first or old ID, for example, the first cell ID, of the cell in the device 310-3 (used when the device 310-3 connects to the second device 320, or when the device 310-3 setup F1 interface with the second device 320), and the second or new ID, for example, the second ID, of the cell in the device 310-3 (to be used when the device 310-3 connects to the third device 330 after the topology adaptation or mobility, or when the device 310-3 setup F1 interface with the third device 330). In a further embodiment, the fourth device 340 may reconfigure the slice support information of the device 310-3 and its children node (not shown) considering the slice support information of the third device 330. In this message, the fourth device 340 can also include the second PCI together with the Cell ID allocated to the cell of device 310-3, and the mapping between the second physical cell identity and the first physical cell identity.

The device 310-3 may inform 5011 the second device 320 the second identity information, for example, the mapping between the first cell ID and the second cell ID. The device 310-3 may initiate 5012 F1 setup with the third device 330. The F1 set up request may include the device 310-3's new cell ID(s). This step is to inform the third device 330 the new cell IDs to be used by the device 310-3 after topology adaptation or handover.

The device 310-3 may keep its F1 connection to the second device 320, so that the fifth device 350 can still communicate with the second device 320 and receive the RRC Reconfiguration to operate with the new Cell ID.

By knowing the second identity information, for example, the mapping between old cell ID and new cell ID, the second device 320 may transmit 5013 the handover request message to the third device 330 to initiate the handover preparation for the fifth device 350 connected to the device 310-3. The second device 320 determine the target cell identity based on the second identity information, and a first cell identity for the cell provided by the device 310-3 that is serving the terminal device. The handover request message may comprise the determined target cell ID set to the new cell ID mapped from the related old cell ID. This ensures the fifth device 350 is served by the same physical cell/radio resource after the device 310-3 is handed over or migrated to the third device 330.

The third device 330 may transmit 5014 a UE context setup request to the device 310-3. The device 310-3 transmit 5015 a UE context setup response to the third device 330. The third device 330 may transmit 5016 a handover request acknowledgment to the second device 320 over the Xn interface. The device 310-3 may transmit 5017 a UE Context Modification Request message or a downlink RRC transfer message (for example, including the RRC Reconfiguration for the device 310-3) to the device 310-3. The device 310-3 may transmit 5018 RRC Reconfiguration to the fifth device 350. The device 310-3 may then connect to the third device 330 and start operation with new cell IDs.

Figure 6:
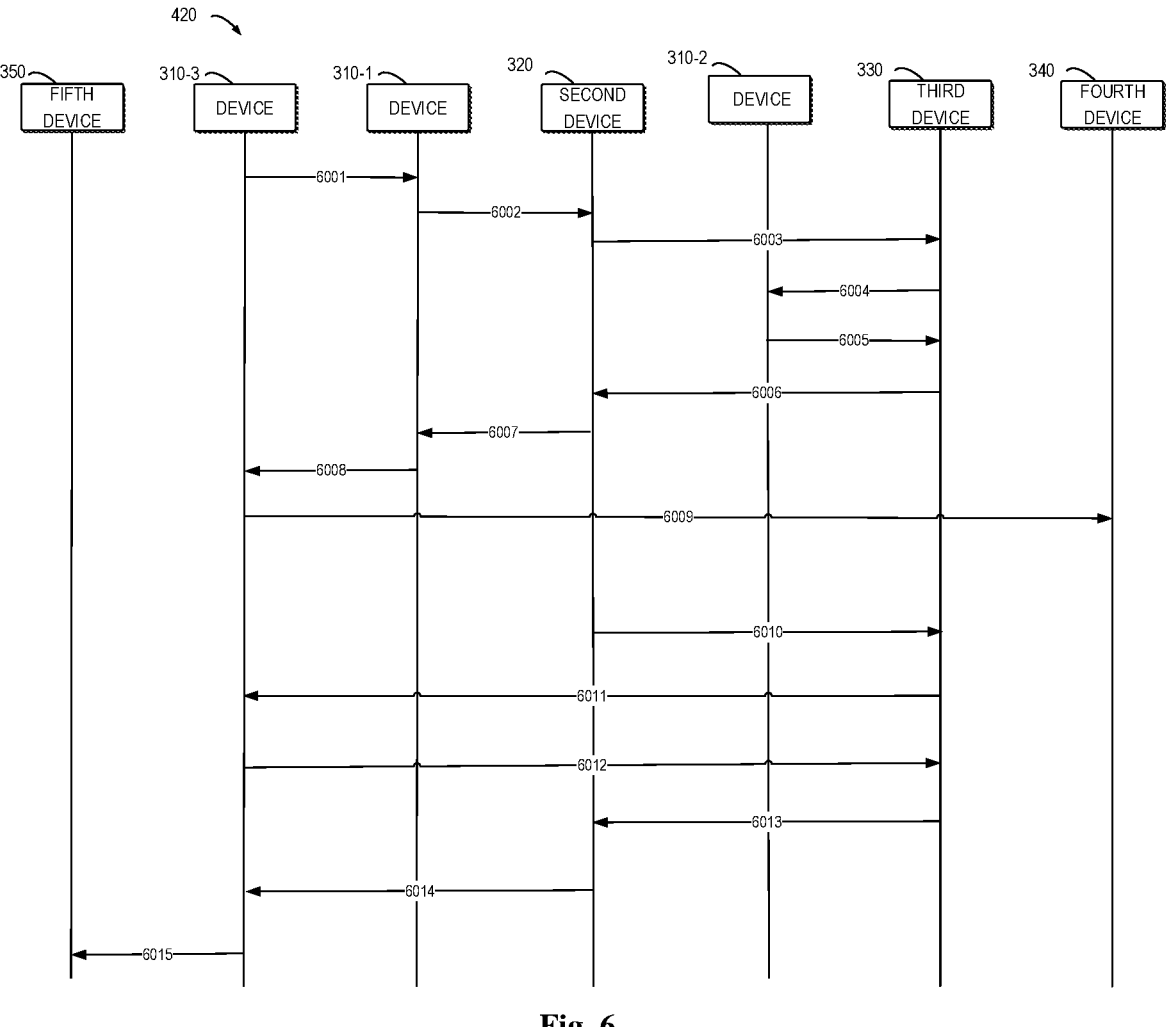
FIG. 6 illustrates a schematic diagram of interactions among devices according to embodiments of the present disclosure.

FIG. 6 illustrates an example of the procedure 420 according to some embodiments of the present disclosure. By way of example, embodiment shown in FIG. 6 involves the device 310-3, the device 310-1, the device 310-2, the second device 320, the third device 330, the fourth device 340 and the fifth device 350. The device 310-1 may be the parent node of the device 310-3 and the fifth device 350 may connect with the device 310-3.

The device 310-3 may send 6001 a measurement report message to the device 310-1 which may be a source IAB-node DU. The device 310-1 may transmit 6002 an uplink RRC transfer message to the second device 320 to convey the received measurement report. The second device 320 may transmit 6003 an Xn Handover Request message to the third device 330 to initiate handover preparation for the device 310-3. The second device 320 may include old or first identity, for example, at least one of the first cell ID or first physical cell ID for the cell(s) provided by the device 310-3 in the Xn Handover Request message.

The third device 330 may transmit 6004 a UE Context Setup Request message to the device 310-2 to create an MT context and setup one or more bearers. The device 310-2 may respond 6005 to the third device 330 with a UE Context Setup Response message.

The third device 330 allocate the second identity, for example, the second cell ID for the cell provided by the device 310-3. The second identity includes at least one of the second cell identity and second physical cell identity. The third device 330 may respond 6006 to the second device 320 with an Xn Handover Request Acknowledge message including the second identity information. The second identity information include at least the second cell identity, the second physical cell identity, the mapping between the second cell identity and the first cell identity, and the mapping information between the second physical cell identity and the first physical cell identity. The second identity information may also be included in the HandoverCommand message.

The second device 320 may send 6007 a UE Context Modification Request message to the device 310-1, which includes a generated RRCReconfiguration message for the device 310-3. The device 310-1 may forward 6008 the received RRCReconfiguration message to the device 310-3. The device 310-3 may recognize that the RRCReconfiguration is association with migration to a different TAB-donor CU. The RRCReconfiguration message may also include the above second identity information.

The device 310-3 may report 6009 the received second identity information to the fourth device 340. The device 310-3 may keep its F1 connection to the second device 320, so that the fifth device 350 can still communicate with the second device 320 and receive the RRC Reconfiguration to operate with the new Cell ID.

By knowing the second identity information including the mapping between the old cell ID and new cell ID, the second device 320 determine the target cell identity based on the second identity information, and a first cell identity for the cell provided by the device 310-3 that is serving the terminal device. The second device 320 may transmit 6010 the handover request message to the third device 330 to initiate the handover preparation for the fifth device 350 connected to the device 310-3. The handover request message may comprise the determined target cell ID mapped from the related old cell ID. This ensures the fifth device 350 is served by the same physical cell/radio resource after the device 310-3 is handover or migrated to the third device 330.

The third device 330 may transmit 6011 a UE context setup request to the device 310-3. The device 310-3 transmit 6012 a UE context setup response to the third device 330. The third device 330 may transmit 6013 a handover request acknowledgment to the second device 320 over the Xn interface. The device 310-3 may transmit 6014 a downlink RRC transfer message (for example, RRC Reconfiguration for the device 310-3) to the device 310-3. The device 310-3 may transmit 6015 RRC Reconfiguration to the fifth device 350. The device 310-3 may then connect to the third device 330 and start operation with new cell IDs.

Figure 7:
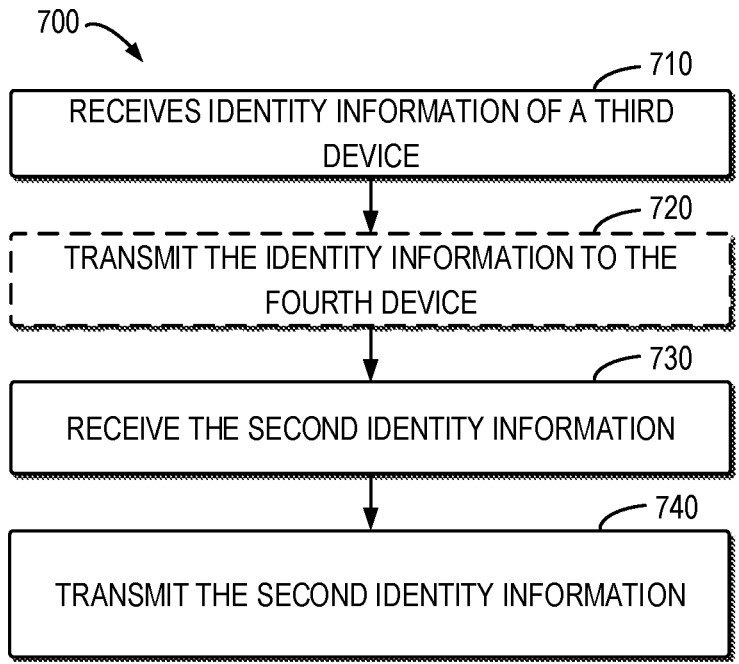
FIG. 7 illustrates a flow chart of a method implemented at a device according to embodiments of the present disclosure.

FIG. 7 is a flowchart of a method 700 implemented at the first device 310 according to some example embodiments of the present disclosure. For the purpose of discussion, the method 700 will be described with reference to FIG. 3. It should be noted that the method 700 can be implanted at any suitable devices. For example, the method 700 can be implemented at a parent IAB node. Alternatively or in addition, the method can also be implemented at a child IAB node.

In some embodiments, the first device 310 may transmit a measurement report to the second device 320. The measurement report may indicate link qualities for the neighboring devices.

At block 710, the first device 310 receives identity information of a third device 330 from a second device 320. The first device 310 is to be handed over or migrated from the second device 320 to the third device 330. In one embodiment, the identify information is provided by the third device 330. The identity information can be the cell identity of a target cell in the third device 330 for the handover or migration of the first device 310, or the node identity of the third device 330.

In some embodiments, at block 720, the first device 310 may transmit the identity information of the third device 330 to the fourth device 340. In some embodiments, the first device 310 may transmit the identity information of the third device 330 to a fourth device 340 to retrieve the second identity information, for example, the second or new cell identity for the cell of the first device 310. In some example embodiments, the identity information of the third device 330 comprises at least one of: a global node identity, a cell identity of the cell of third device, and a physical cell identification of the cell of the third device 330.

At block 730, the first device 310 receives the second identity information which comprises at least the second identity of the cell allocated for the cell of the first device 310 and mapping information between the second identity of a cell of the first device 310, and a first identity of the cell of the first device 310. The identity can be a NR cell identity, or a physical cell identity. In one embodiment, the first device 310 receive the second identity cell information from the fourth device 340.

The second identity information may comprise at least one of: a second cell identity of the cell provided by the first device 310 when the first device 310 is in communication with the third device 330 or when the first device 310 setup F1 interface with the third device 330, a second physical cell identity of the cell provided by the first device 310 when the first device 310 is in communication with the third device 330 or when the first device 310 setup F1 interface with the third device 330, a mapping between the second cell identity of the cell provided by the first device 310 and a first cell identity of the cell provided by the first device 310 when the first device 310 in communication with the second device 320, or a mapping between the second physical cell identity of the cell provided by the first device 310 and a first physical cell identity of the cell provided by the first device 310 when the first device 310 in communication with the second device 320.

Alternative or in addition, the first device 310 may transmit the second identity information to the second device 320. In other embodiments, the second identity information may comprise at least the second cell identify of the cell, the second PCI of the cell, the mapping between the second cell identity and the first cell identity, and the mapping between the second physical cell identity and the first physical cell identity.

In other embodiments, the first device 310 receives the second identity information from the second device 320 during a handover preparation procedure for the first device 310. In one embodiment, the second identity information is allocated by the third device 330 and provided to the second device 320. The first device 310 may transmit the second identity information to the fourth device 340.

At block 740, the first device 310 transmits to the second device 320 the second identity information. In one embodiment, the first device 310 may only transmit the mapping information to the second device 320. In other embodiments, the first device 310 use the second identity when the first device 310 initiate the F1 setup with the third device 330.

Figure 8:
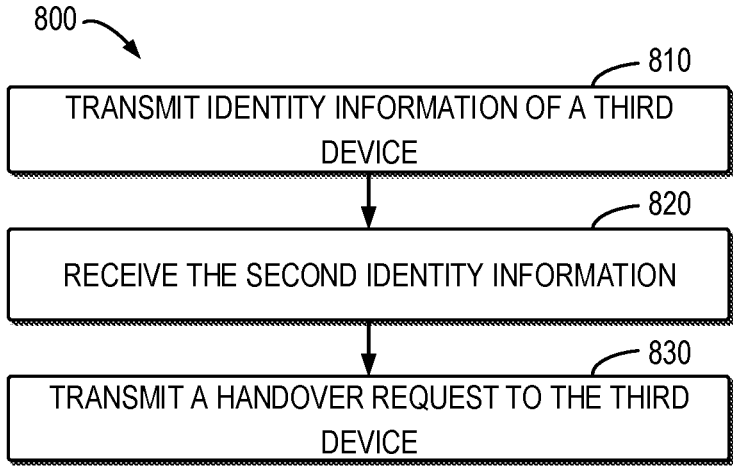
FIG. 8 illustrates a flow chart of a method implemented at a device according to embodiments of the present disclosure.

FIG. 8 is a flowchart of a method 800 implemented at the second device 320 according to embodiments of the present disclosure. For the purpose of discussion, the method 800 will be described with reference to FIG. 3.

At block 810, the second device 320 transmits identity information of a third device 330 to the first device 310. The first device 310 is to be handed over or migrated from the second device 320 to the third device 330. In some example embodiments, the identity information of the third device 330 comprises at least one of: a global node identity, a cell identity of the cell of third device, and a physical cell identification of the cell of the third device 330.

At block 820, the second device 320 receives the second identity information for the cell(s) provided by the first device 310. The second identity information may include at least one of the second cell identity, the second physical cell identity, and the mapping information between the second identity of a cell of the first device and a first identity of the cell of the first device 310, from the first device 310 or from the third device 330. In some embodiments, the second device 320 may obtain at least one of the second cell identity of the cell and the second physical cell identification of the cell. In some embodiments, the second device 320 may receive from the first device 310 the second identity information including the mapping information between the second identity of a cell of the first device 310 and a first identity of the cell of the first device 310. In some other embodiments, the second device 320 may receive from the third device 330 the second identity information during the handover preparation procedure for the first device 310.

The second device 320 may use the second identity information to determine a target cell identity and initiate a handover preparation for the terminal device 350 connected with the first device 310. At block 830, the second device 320 transmits a handover request to the third device 330. The handover request may at least indicate the determined identity of the cell of the first device 310, based on the second identity information, and the first identity to identify the serving cell in the first device 310.

Figure 9:
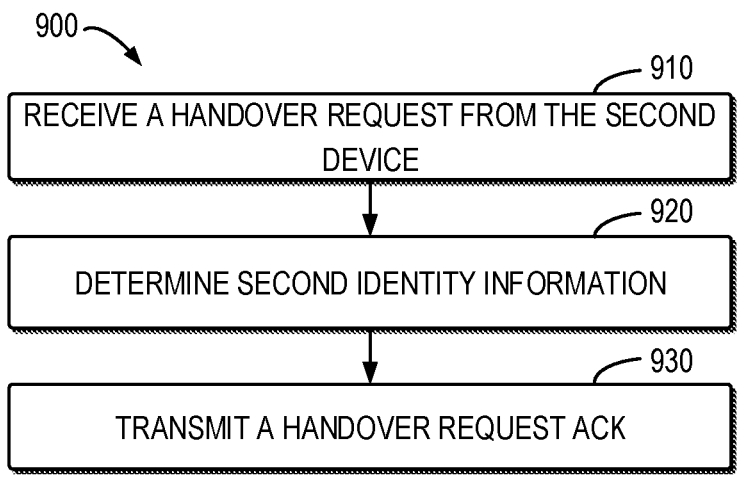
FIG. 9 illustrates a flow chart of a method implemented at a device according to embodiments of the present disclosure.

FIG. 9 is a flowchart of a method 900 implemented at the third device 330 according to some example embodiments of the present disclosure. For the purpose of discussion, the method 900 will be described with reference to FIG. 3.

At block 910, the third device 330 receives a handover request from a second device. The handover request at least indicates a first identity for the cell of a first device 310 when the first device in communication with a second device 320. The first identity includes at least one of the cell identity and physical cell identity.

At block 920, the third device 330 allocates the second identity and determines the second identity information for a cell provided by the first device 310 when the first device 310 is in communication with the second device 320. For example, the third device 330 may allocate a second identity for at least one cell of the first cell 310. The second identity includes at least one of the cell identity and physical cell identity.

At block 930, the third device 330 transmits a handover request acknowledgment for the first device 310. The handover request acknowledgment comprises the second identity information for the at least one cell of the first device 310. The second identity information includes the allocated second identity, and the mapping between the second identity and the first identity.

Figure 10:
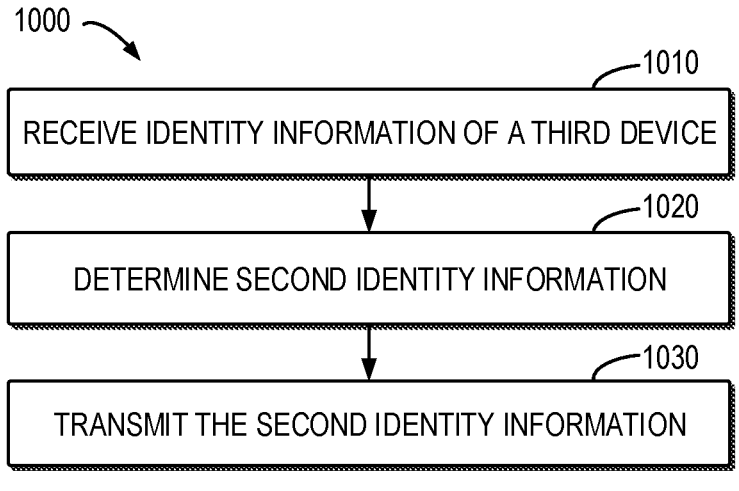
FIG. 10 illustrates a flow chart of a method implemented at a device according to embodiments of the present disclosure.

FIG. 10 is a flowchart of a method 1000 implemented at the fourth device 340 according to embodiments of the present disclosure. For the purpose of discussion, the method 1000 will be described with reference to FIG. 3.

At block 1010, the fourth device 340 receives identity information of a third device 330 from a first device 310. The first device 310 is to be handed over from the second device 320 to the third device 330.

At block 1020, the fourth device 340 allocates the second identity and determines second identity information based on the identity information of the third device 330. For example, the second identity information may comprise the second identity which can be used by the first device when the first device 310 connect with or setup F1 interface with the third device 330. Alternatively or in addition, the fourth device 340 may determine mapping information between the second identity of a cell of the first device 310 and a first identity of the cell of the first device 310.

At block 1030, the fourth device 340 transmits to the first device 310 the second identity information. The second identity information may further comprise at least one of following: a second cell identity, a second physical cell identity, a mapping between a second cell identity and a first cell identity, and a mapping between a second physical cell identity and a first cell identity.

In some embodiments, the fourth device 340 may determine a configuration of network slice based on network slice information of the third device 330. The fourth device 340 may transmit the configuration of network slice to the first device 310.

In some example embodiments, a first apparatus capable of performing any of the method 700 (for example, the first device 310) may comprise means for performing the respective operations of the method 700. The means may be implemented in any suitable form. For example, the means may be implemented in a circuitry or software module. The first apparatus may be implemented as or included in the first device 310. In some example embodiments, the means may comprise at least one processor and at least one memory including computer program code. The at least one memory and computer program code are configured to, with the at least one processor, cause performance of the apparatus.

In some embodiments, the apparatus comprises means for receiving, at a first device and from a second device, identity information of a third device, the first device to be handed over or migrated from the second device to the third device; means for obtaining second identity information for a cell provided by the first device; and means for transmitting to the second device the second identity information.

In some embodiments, the means for obtaining the second identity information for the cell comprises: means for transmitting the identity information of the third device to a fourth device; and means for receiving from the fourth device the second identity information for the cell provided by the first device.

In some embodiments, the apparatus further comprises means for obtaining the second identity information for the cell comprises means for receiving from the second device the second identity information for the cell provided by the first device.

In some embodiments, the second identity information further comprises at least one of: a second cell identity, a second physical cell identity, a mapping between the second cell identity and a first cell identity used by the first device when the first device is in communication with the second device, or a mapping between the second physical cell identity and a first physical cell identity used by the first device when the first device is in communication with the second device.

In some embodiments, the apparatus further comprises means for transmitting the second identity information for the cell to a fourth device.

In some embodiments, the identity information of the third device comprises at least one of: a global node identity, a cell identity of the cell of third device, and a physical cell identification of the cell of the third device.

In some example embodiments, a second apparatus capable of performing any of the method 800 (for example, the second device 320) may comprise means for performing the respective operations of the method 800. The means may be implemented in any suitable form. For example, the means may be implemented in a circuitry or software module. The second apparatus may be implemented as or included in the second device 320. In some example embodiments, the means may comprise at least one processor and at least one memory including computer program code. The at least one memory and computer program code are configured to, with the at least one processor, cause performance of the apparatus.

In some embodiments, the apparatus comprises means for transmitting, at a second device and to a first device, identity information of a third device, the first device to be handed over or migrated from the second device to the third device; means for obtaining, from the first device or from the third device, second identity information for a cell provided by the first device; and means for transmitting a handover request to the third device, the handover request at least indicating a determined cell identity for the cell.

In some embodiments, the apparatus further comprises means for transmitting a further handover request for the first device to the third device, the further handover request indicating a first cell identity for a cell provided the first device when in communication with the second device, the first cell identity used by the first device when the first device is in communication with the second device; and means for receiving from the third device a further handover request acknowledgment for the first device comprising the second identity information for the cell of the first device.

In some embodiments, the second identity information further comprises at least one of: a second cell identity, a second physical cell identity, a mapping between the second cell identity and a first cell identity used by the first device when the first device is in communication with the second device, or a mapping between the second physical cell identity and a first physical cell identity used by the first device when the first device is in communication with the second device.

In some example embodiments, the apparatus further comprises means for determining the cell identity based on the second identity information and a first cell identity for a cell provided by the first device, the first cell identity used by the first device when the first device is in communication with the second device.

In some example embodiments, a third apparatus capable of performing any of the method 900 (for example, the third device 330) may comprise means for performing the respective operations of the method 900. The means may be implemented in any suitable form. For example, the means may be implemented in a circuitry or software module. The third apparatus may be implemented as or included in the third device 330. In some example embodiments, the means may comprise at least one processor and at least one memory including computer program code. The at least one memory and computer program code are configured to, with the at least one processor, cause performance of the apparatus.

In some embodiments, the apparatus comprises means for receiving at a third device a handover request for a first device from a second device, the handover request at least indicating a first identity for a cell provided by a first device when the first device is in communication with the second device; means for allocating second identity information for a cell provided by the first device; and means for transmitting a handover request acknowledgment for the first device comprising the second identity information.

In some embodiments, the apparatus further comprises means for receiving a further handover request from the second device, the further handover request at least indicating the second cell identity for the cell provided by the first device, the second identity to be used by the first device when the first device is in communication with the third device.

In some embodiments, the second identity information further comprises at least one of: a second cell identity, a second physical cell identity, a mapping between the second cell identity and a first cell identity used by the first device when the first device is in communication with the second device, or a mapping between the second physical cell identity and a first physical cell identity used by the first device when the first device is in communication with the second device.

In some example embodiments, a fourth apparatus capable of performing any of the method 1000 (for example, the fourth device 340) may comprise means for performing the respective operations of the method 1000. The means may be implemented in any suitable form. For example, the means may be implemented in a circuitry or software module. The fourth apparatus may be implemented as or included in the fourth device 340. In some example embodiments, the means may comprise at least one processor and at least one memory including computer program code. The at least one memory and computer program code are configured to, with the at least one processor, cause performance of the apparatus.

In some embodiments, the apparatus comprises means for receiving, at a fourth device and from a first device, identity information of a third device; means for determining second identity information based on the identity information of the third device; and means for transmitting to the first device the second identity information.

In some example embodiments, the identity information of the third device comprises at least one of: a global node identity, a cell identity of the cell of third device, and a physical cell identification of the cell of the third device.

In some embodiments, the second identity information further comprises at least one of: a second cell identity, a second physical cell identity, a mapping between the second cell identity and a first cell identity used by the first device when the first device is in communication with the second device, or a mapping between the second physical cell identity and a first physical cell identity used by the first device when the first device is in communication with the second device.

In some embodiments, the apparatus further comprises means for transmitting the information further comprising mapping information between the identity of the cell of the third device and a further identity of a further cell of the second device.

In some embodiments, the information further comprises a physical cell identification of the cell.

In some embodiments, the apparatus further comprises means for determining a configuration of network slice based on network slice information of the third device; and means for transmitting the configuration of network slice to the first device.

Figure 11:
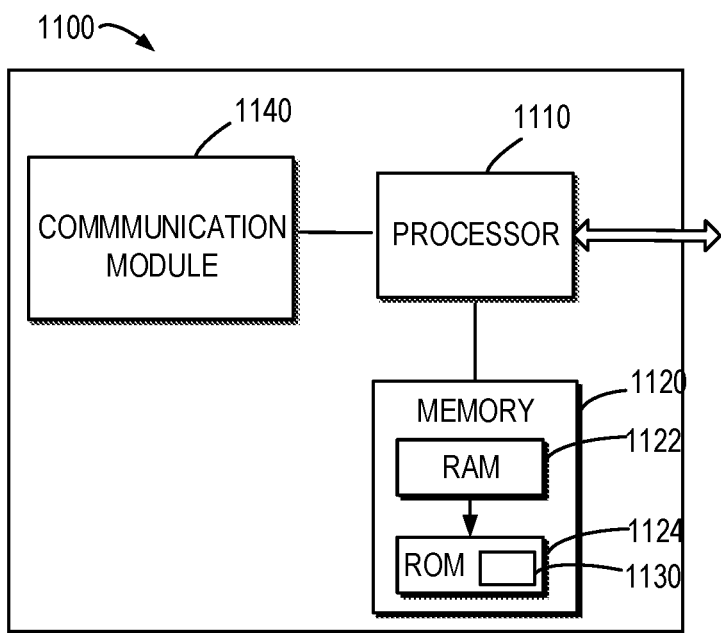
FIG. 11 illustrates a schematic diagram of a device according to embodiments of the present disclosure.

FIG. 11 is a simplified block diagram of a device 1100 that is suitable for implementing embodiments of the present disclosure. The device 1100 may be provided to implement the communication device, for example, the first device 310, the second device 320, the third device 330, the fourth device 340 or the fifth device 350 as shown in FIG. 3. As shown, the device 1100 includes one or more processors 1110, one or more memories 1120 coupled to the processor 1110, and one or more communication module (for example, transmitters and/or receivers (TX/RX)) 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process of the disclosure as discussed with reference to FIGS. 4-10. The embodiments of the present disclosure may also be implemented by hardware or by a combination of software and hardware.

Figure 12:
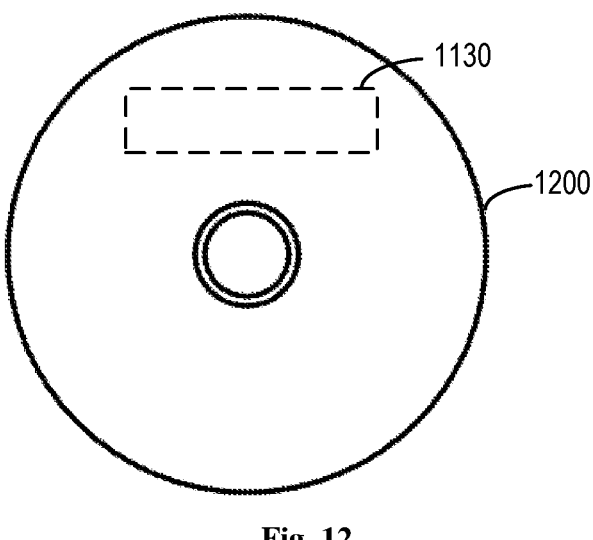
FIG. 12 shows a block diagram of an example computer readable medium in accordance with some embodiments of the present disclosure.

In some embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700 to 1000 as described above with reference to FIGS. 7-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory including computer program codes;

the at least one memory and the computer program codes are configured to, with the at least one processor, cause the first device to:

in response to a transmission of a handover request for the first device to be handed over from a second device to a third device, wherein the handover is configured as a conditional handover, performing the following operations prior to the conditional handover:

receive, from the second device, identity information of the third device, the identity information comprising: a global node identity of the third device, a cell identity of a cell of the third device, and a physical cell identity of a cell of the third device;

in response to receiving the identity information of the third device, transmit the identity information of the third device to a fourth device;

obtain, from the fourth device, second identity information comprising: a second cell identity for use when the first device is in communication with the third device, a second physical cell identity, a mapping between the second cell identity and a first cell identity used by the first device when in communication with the second device, and a mapping between the second physical cell identity and a first physical cell identity used by the first device when in communication with the second device; and cause the second device to determine a corresponding target cell identify for a terminal device connected to the first device with a corresponding target cell identity by transmitting the second identity information to the second device.

2. The first device of claim 1, wherein the first device comprises an Integrated Access and Backhaul (IAB) device, the second device comprises a source donor centralized unit (Donor-CU), the third device comprises a target Donor-CU and the fourth device comprise an Operations Administration and Maintenance (OAM) server.

* * * * *